US008472459B2

(12) United States Patent
Lee et al.

(10) Patent No.: US 8,472,459 B2
(45) Date of Patent: Jun. 25, 2013

(54) SYSTEM AND METHOD FOR PROBING A CHANNEL IN A COMMUNICATION SYSTEM

(75) Inventors: Yong-Hwan Lee, Seoul (KR); Seung-Hwan Lee, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1439 days.

(21) Appl. No.: 11/940,249

(22) Filed: Nov. 14, 2007

(65) Prior Publication Data

US 2008/0113622 A1      May 15, 2008

(30) Foreign Application Priority Data

Nov. 15, 2006   (KR) .................. 10-2006-0112811

(51) Int. Cl.
*H04L 12/56* (2006.01)
*H04J 1/16* (2006.01)

(52) U.S. Cl.
USPC .......... 370/430; 370/252; 370/337; 370/343; 370/347

(58) Field of Classification Search
USPC ............... 370/310, 314, 329, 337, 343, 347, 370/430, 252
See application file for complete search history.

(56) References Cited

U.S. PATENT DOCUMENTS

| 2005/0084000 | A1* | 4/2005 | Krauss et al. ............. 375/148 |
| 2005/0223102 | A1* | 10/2005 | Zhang et al. ............. 709/228 |
| 2006/0146949 | A1* | 7/2006 | Bykovnikov ............. 375/260 |
| 2006/0291582 | A1* | 12/2006 | Walton et al. ............. 375/267 |
| 2007/0066362 | A1* | 3/2007 | Ma et al. ............. 455/562.1 |
| 2007/0110093 | A1* | 5/2007 | Tang ............. 370/450 |
| 2007/0130097 | A1* | 6/2007 | Andreev et al. ............. 706/46 |
| 2007/0149161 | A1* | 6/2007 | Amtmann et al. ............. 455/333 |
| 2007/0189334 | A1* | 8/2007 | Awad ............. 370/491 |
| 2007/0201572 | A1* | 8/2007 | Krauss et al. ............. 375/260 |
| 2007/0242600 | A1* | 10/2007 | Li et al. ............. 370/210 |
| 2008/0056200 | A1* | 3/2008 | Johnson ............. 370/333 |
| 2008/0113624 | A1* | 5/2008 | Seidel et al. ............. 455/67.13 |
| 2008/0304551 | A1* | 12/2008 | Li et al. ............. 375/140 |
| 2009/0323766 | A1* | 12/2009 | Wang et al. ............. 375/130 |

FOREIGN PATENT DOCUMENTS

| KR | 10-2005-0063652 A | 6/2005 |
| KR | 10-2005-0119590 A | 12/2005 |
| KR | 10-2006-0000185 A | 1/2006 |
| KR | 10-2006-0091581 A | 8/2006 |

* cited by examiner

*Primary Examiner* — John Pezzlo
(74) *Attorney, Agent, or Firm* — Jefferson IP Law, LLP (57) ABSTRACT

A system and method for probing a channel by a base station in a communication system is provided. The channel probing includes performing pre-probing for selecting a subchannel, adjusting a subcarrier distance of a probing signal according to frequency selectivity indicative of frequency-domain channel selectivity based on a time channel correlation of each of a plurality of users and performing main-probing for transmitting the probing signal on the selected subchannel.

18 Claims, 8 Drawing Sheets

SYSTEM AND METHOD FOR PROBING A CHANNEL IN A COMMUNICATION SYSTEM

PRIORITY

This application claims the benefit under 35 U.S.C. §119 (a) of a Korean patent application filed in the Korean Intellectual Property Office on Nov. 15, 2006 and assigned Serial No. 2006-112811, the entire disclosure of which is hereby incorporated by reference.

JOINT RESEARCH AGREEMENT

The claimed invention was made by, on behalf of, and/or in connection with one or more of the following parties to a joint university-corporation research agreement: Samsung Electronics Co. Ltd. and Seoul National University Industry Foundation. The agreement was in effect on and before the date the claimed invention was made and the claimed invention was made as a result of activities undertaken within the scope of the agreement.

BACKGROUND OF THE INVENTION

1. Field of the Invention

The present invention relates generally to a communication system. More particularly, the present invention relates to a system and method for probing a channel in an Orthogonal Frequency Division Multiplexing (OFDM) packet transmission system.

2. Description of the Related Art

The OFDM scheme is a multi-carrier modulation scheme that is capable of increasing transmission efficiency by obtaining Multi-User Diversity (MUD) gain using an Opportunistic Scheduling (OS) technique in a multi-user wireless transmission/reception packet-based system. The OFDM scheme is commonly used with various digital transmission technologies.

The OFDM scheme, though it is similar to the conventional Frequency Division Multiplexing (FDM) scheme, has a special characteristic in that it can obtain optimal transmission efficiency during high-speed data transmission by maintaining the orthogonality between multiple subcarriers during their transmission. The OFDM scheme can obtain optimal transmission efficiency during high-speed data transmission because it has high frequency utilization efficiency and is robust against multi-path fading. Further, the OFDM scheme, as it overlaps frequency spectrums, not only has high frequency utilization efficiency and is robust against frequency-selective fading and multi-path fading, but it can also reduce an inter-symbol interference effect using a guard interval, can facilitate the design of a hardware structure of an equalizer and is robust against impulse noises. For these reasons, it is commonly used for a communication system configuration.

The multi-user wireless transmission/reception packet-based Time Division Duplex (TDD) system determines a Modulation and Coding Scheme (MCS) and selects a transmission band according to a Channel Quality Indicator (CQI) of the downlink when transmitting uplink data. However, the system performance may decrease due to a CQI feedback delay problem and/or an information quantization error. In the Frequency Division Duplex (FDD) system, unlike in the TDD system, the uplink/downlink channel characteristics are different from each other. Therefore, in the FDD system it is essential to send a probing signal in order to acquire frequency channel information.

The channel probing used in the conventional Institute of Electrical and Electronics Engineers (IEEE) 802.16e system allocates consecutive probing subchannels in the last region of the uplink and employs them. According to the prior art, a base station (BS) provides each user (e.g. mobile station (MS)) with the information indicating the start position and the number of probing transmission subchannels using a downlink channel. Because the probing transmission information delivered from the base station is composed of only the start position and the number of subchannels, each user transmits as many probing signals as the number of subchannels consecutively allocated, beginning at the start position.

However, because the above-described method consecutively allocates the probing transmission subchannels, it needs to probe signal transmissions over the full frequency band to fully detect the channel state of the full band. Accordingly, its probing burden is very high. In addition, because this method can acquire the channel characteristic only for the subchannels undergoing the probing, the decrease in the number of allocated probing transmission subchannels decreases the possibility that the optimal transmission region will be selected for each user. This causes a decrease in the total system performance.

Further, the consecutive allocation of the probing transmission subchannels cannot provide the frequency diversity effect for selecting the optimal transmission region. That is, because the inter-channel correlation is high between adjacent frequency bands, the probing performed using the consecutive subchannels decreases the channel variation between the transmission probing frequency regions, causing a decrease in the probing effect.

In an OFDM system, to apply the OS method, the base station needs full-band instantaneous Signal-to-Noise Ratios (SNRs) for all users. However, this causes a considerable probing signaling burden. In addition, an increase in the moving velocity of the user requires a greater amount of probing information to prevent the performance reduction. When the total number of users of the system is denoted by K, the number of subchannels is denoted by M, a length of the time domain is denoted by T, and the number of bits of a probing signal needed to obtain an instantaneous SNR is denoted by B, the entire overhead of the probing signal required for OS is KMB/T bps. Therefore, an increase in the total number of subchannels or users of the system causes a linear increase in the burden of the probing signals.

Accordingly, there is a need for a transmission scheme for maximizing the system performance while minimizing the probing burden.

SUMMARY OF THE INVENTION

An aspect of the present invention is to address at least the above-mentioned problems and/or disadvantages and to provide at least the advantages described below. Accordingly, an aspect of the present invention is to provide a probing system and method including pre-probing for selecting an optimal probing subchannel having a good channel condition and main-probing for transmitting a probing signal only on the selected subchannel in a communication system.

Another aspect of the present invention is to provide a channel probing system and method for preventing performance reduction due to a decrease in the number of probing transmission subchannels by the frequency diversity effect while reducing the probing burden by selectively transmitting a probing signal only on the subchannel having a good channel characteristic in a communication system.

According to one aspect of the present invention, a method for probing a channel by a base station in a communication system is provided. The channel probing method includes performing pre-probing for selecting a subchannel, adjusting a subcarrier distance of a probing signal according to frequency selectivity indicative of frequency-domain channel selectivity based on a time channel correlation of each of a plurality of users and performing main-probing for transmitting the probing signal on the selected subchannel.

According to another aspect of the present invention, a system for probing a channel in a communication system is provided. The channel probing system includes a base station for performing pre-probing for selecting a subchannel, for adjusting a subcarrier distance of a probing signal according to frequency selectivity indicative of frequency-domain channel selectivity based on a time channel correlation of each of a plurality of users and for performing main-probing for transmitting the probing signal on the selected subchannel.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a system and method for performing channel probing using a time channel correlation (or time-domain channel correlation) in an Orthogonal Frequency Division Multiplexing (OFDM) packet transmission system. An exemplary embodiment of the present invention will be described herein with reference to a multi-user wireless transmission/reception packet-based uplink OFDM system having a plurality of subchannels, each of which includes multiple consecutive subcarriers.

The following description of an exemplary embodiment of the present invention will include a separate description for a pre-probing step of selecting a subchannel having a good channel characteristic while adjusting a subcarrier distance of a probing signal according to a frequency-domain channel selectivity (or frequency selectivity) based on the time channel correlation of each user, and a separate description for a main-probing step of transmitting the probing signal only on the selected subchannel in the uplink OFDM system. The term 'user' as used herein refers to, for example, a mobile station.

In the OFDM packet transmission system according to an exemplary embodiment of the present invention, the probing system and method based on the time channel correlation is performed in an uplink OFDM system that supports a total number K of users and has a total number M of subchannels, each of which includes N consecutive subcarriers. In an exemplary system and method, each user estimates a channel correlation in the time domain using a downlink common pilot. Thereafter, the user reports the estimated channel correlation characteristic to a base station and the base station uses the channel correlation characteristic of each user for the probing method.

Figure 1:
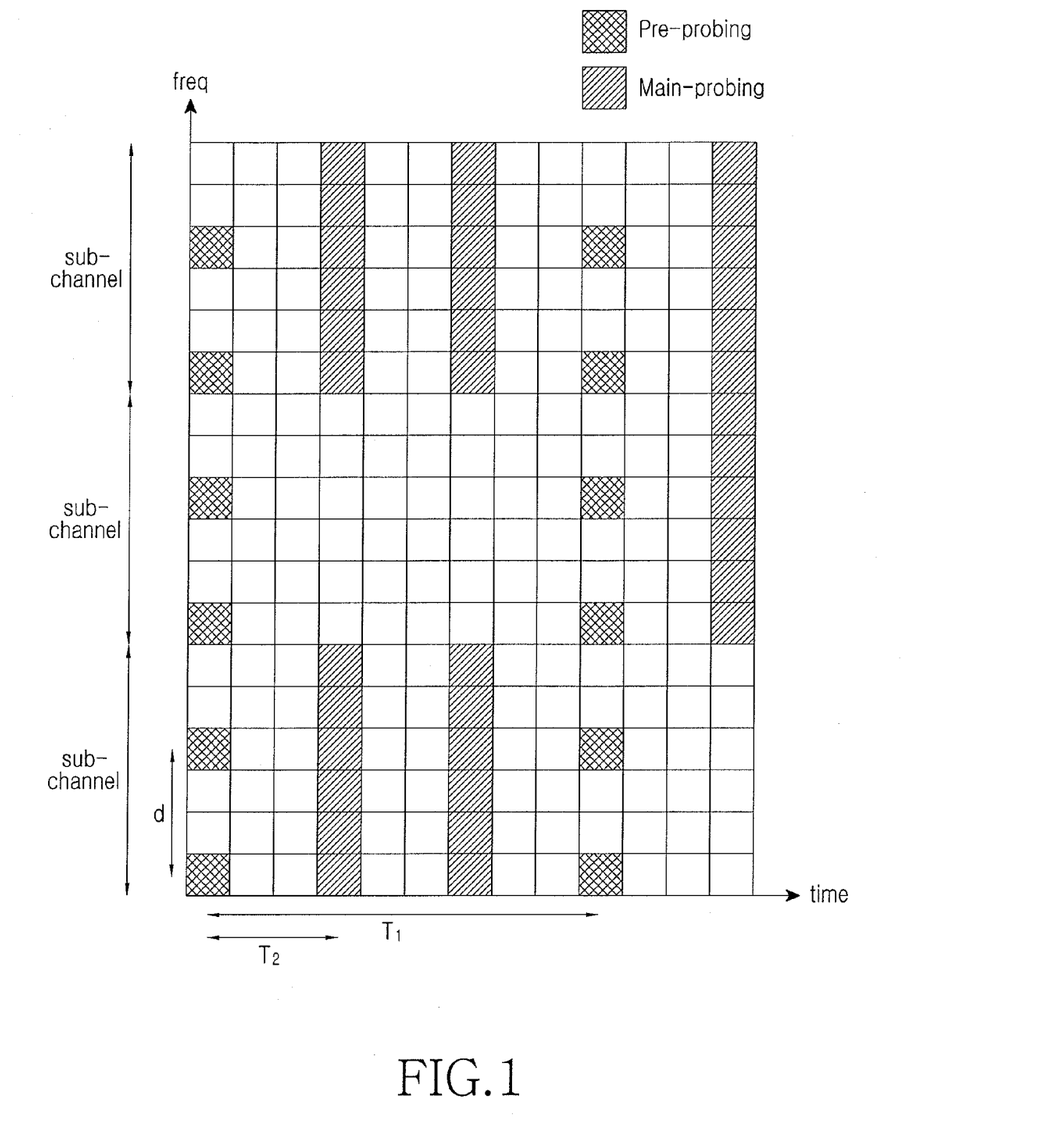
FIG. 1 illustrates a probing method using a time channel correlation in an OFDM packet transmission system according to an exemplary embodiment of the present invention.

FIG. 1 illustrates a probing method using a time channel correlation in an OFDM packet transmission system according to an exemplary embodiment of the present invention.

Referring to FIG. 1, the probing method includes pre-probing for finding an optimal probing subchannel having a good channel condition and main-probing for transmitting a probing signal only on the subchannel selected in the pre-probing. The probing method is performed on a step-by-step basis. In the pre-probing and main-probing, when multiple users simultaneously perform probing, the base station can obtain a Multi-User Diversity (MUD) gain by allocating a corresponding subchannel to the user having the better channel characteristic. That is, the pre-probing aims at finding the subchannel having a good channel characteristic in the full frequency band.

Figure 2:
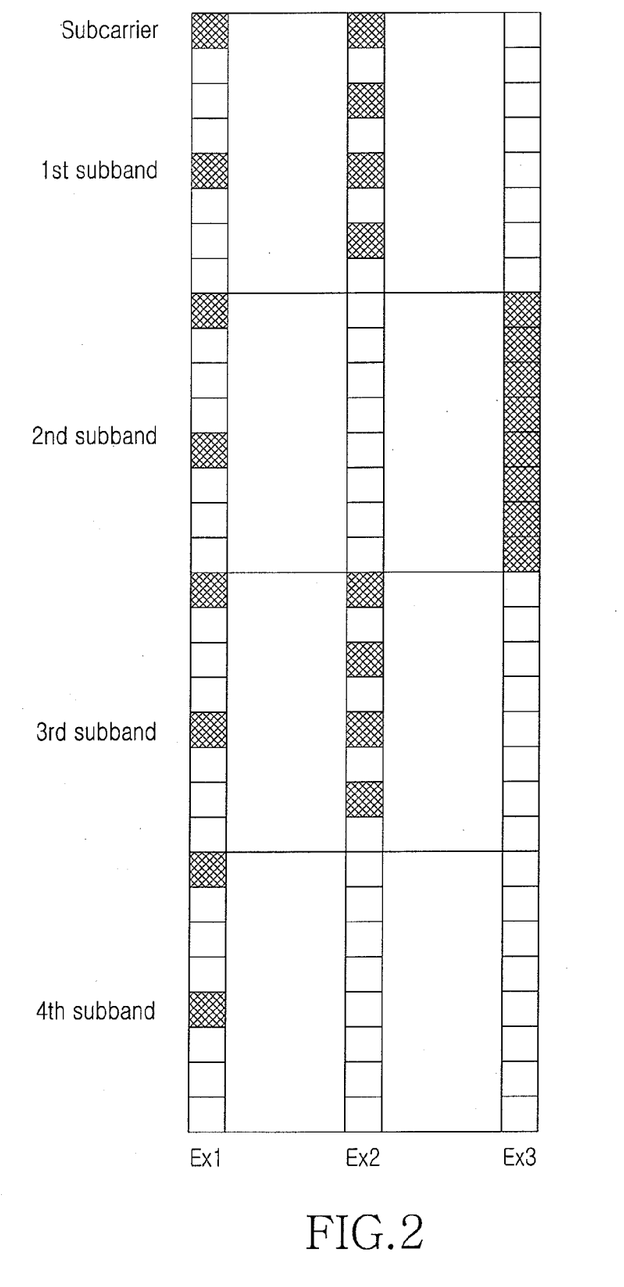
FIG. 2 illustrates subcarrier allocation for a pre-probing signal in a probing method of an OFDM packet transmission system according to an exemplary embodiment of the present invention.

FIG. 2 illustrates subcarrier allocation for a pre-probing signal in a probing method of an OFDM packet transmission system according to an exemplary embodiment of the present invention.

Referring to FIG. 2, in an exemplary implementation of subcarrier allocation for a pre-probing signal, a probing signal is transmitted on more subchannels by disposing the probing signal at intervals of a predetermined distance on a distributed basis rather than disposing the probing signal in one subchannel on a concentrated basis, when using the same resources.

This scheme can minimize the performance reduction while reducing the probing burden. The scheme achieves this by using the fact that the change in the channel characteristic is not great between adjacent subcarriers and also using the characteristic of the pre-probing aimed at the comparison of channel sizes between subchannels rather than the correct estimation between channels. A pre-probing signal $$P_k^p(n, t),$$

as shown in FIG. 2, is transmitted over the full band at intervals of a subcarrier distance $d(\geq K)$.

$$P_k^p(dl + k, t) = c^p(l, t) \quad (1)$$

In Equation (1), $c^p(l,t)$ denotes an $l^{th}$ signal of a pilot sequence, and a superscript p denotes a pre-probing step. Orthogonality is maintained between multiple users by transmitting the pre-probing signal on different subcarriers over the full band as shown in Equation (1).

Next, to allocate the main-probing subchannels, the base station estimates the pre-probing signal and selects a subchannel set $S_k$ having an SNR higher than a measured threshold $\alpha_k$ from among all subchannels. The subchannel set $S_k$ can be expressed as Equation (2).

$$S_k = \{\hat{m}_k | \gamma_k(\hat{m}_k, t) \geq \alpha_k\} \quad (2)$$

In Equation (2), a threshold $\alpha_k$ is determined by adjusting a threshold control parameter $\beta$ as shown in Equation (3).

$$\alpha_k = (1-\beta)(\max\{\gamma_k(m,t)\}) + \beta(\min\{\gamma_k(m,t)\}), 0 \leq \beta \leq 1 \quad (3)$$

Here, for $\beta=0$, each user performs main-probing only on one subchannel having the highest SNR among all subchannels, and for $\beta=1$, each user performs the main-probing on all subchannels.

For this, the main-probing sequence can be expressed as Equation (4).

$$P_k^m(\hat{m}_k N + l, t) = c^p(l, t) \exp\left(\frac{-j2\pi n(k-1)}{\mu}\right), \hat{m}_k \in S_k \quad (4)$$

The $c^p(l,t)$ denotes an $l^{th}$ signal of a pilot sequence, a superscript m denotes a main-probing step, $\mu$ denotes a pilot phase-shift value of the uplink, and k ($1 \leq k \leq \mu$) denotes an index allocated to the user that simultaneously transmits the probing sequence in the same subcarrier.

In Equation (4), the phase shift characteristic for each user of the probing signal allows the channel characteristic for each user to maintain the orthogonality in the time domain. Therefore, with use of the probing signal of Equation (4), the base station can separately estimate the channel values of the multiple users that simultaneously have transmitted the probing signal with the same time and frequency domains.

Here, the base station determines a period $T_1$ of the pre-probing and a period $T_2$ of the main-probing according to the time correlation (or time-domain correlation) between the channels that the users experience, taking the probing burden and the performance into account. An increase in $T_1$ reduces the probability that a subchannel having a good channel condition will be allocated to each user, due to the channel variation An increase in $T_2$ reduces the system performance because a Modulation and Coding Scheme (MCS) value determined based on the channel value estimated in the previous period cannot be correctly coincident with the current channel value. A correlation between time t and time $t+\Delta t$ is defined as Equation (5).

$$R_k(\Delta t) \cong E\{H_k(n, t) H_k^*(n, t + \Delta t)\} \quad (5)$$

In Equation (5), a notation '*' denotes a complex conjugate value.

The period $T_1$ of the pre-probing and the period $T_2$ of the main-probing are defined by Equation (6).

$$\hat{T}_1 = \underset{T_1}{\arg\max}\{R_k(T_1) \leq \delta_1\} \quad (6)$$

$$\hat{T}_2 = \underset{T_2}{\arg\max}\{R_k(T_2) \leq \delta_2\}$$

Here, $\delta_1$ and $\delta_2$ denote correlation thresholds optimized considering both the probing performance and the overhead. In an exemplary implementation, the system properly adjusts the periods such that pre-probing and main-probing signals of the users do not overlap each other.

Next, a description will be made of the user allocated to each subchannel based on the step-by-step probing method according to an exemplary embodiment of the present invention and of the system performance according thereto, under the assumption that thresholds $\alpha_k$ of all users in the system are equal ($\alpha_k = \alpha$).

If a channel gain of an $n^{th}$ subcarrier of a user k at time t is denoted by $H_k(n,t)$ and a channel gain of an $m^{th}$ subchannel is denoted by $\hat{H}_k(m,t)$, the channel gain of the $m^{th}$ subchannel can be obtained by averaging channel gains of all subcarriers in the subchannel in accordance with Equation (7).

$$\tilde{H}_k(m, t) = \frac{1}{N}\sum_{n=0}^{N-1} H_k(mN + n, t) \quad (7)$$

If it is assumed that all users have the same average SNR $\gamma_o$, an instantaneous SNR of the user k, estimated in the subchannel m at time t, can be expressed as Equation (8).

$$\gamma_k(m,t) = |\tilde{H}_k(m,t)|^2 \gamma_o \quad (8)$$

Meanwhile, if it is assumed that the channels the users experience are quasi-static for each individual subchannel, a probability density function (PDF) for an SNR of the corresponding subchannel can be expressed as Equation (9).

$$f(\gamma_k) = \frac{1}{\gamma_o} \exp\left(-\frac{\gamma_k}{\gamma_o}\right), \gamma_k \geq 0 \quad (9)$$

Here, the PDF of the SNR can be expressed as Equation (10).

$$F(\gamma_k) = \int_0^{\gamma_k} f(x) dx \quad (10)$$

In Equation (10), considering a 'best user selection' scheduling technique for selecting the user having the highest SNR among the SNRs of the users, estimated using the probing signal in the subchannel m at the time t, and allocating the corresponding subchannel to the selected user, the user selected by the 'best user selection' scheduling for the subchannel m can be expressed as Equation (11).

$$\pi_m = \arg\max_{k=\{1,\ldots,K\}} \{\gamma_k(m,t)\} \quad (11)$$

When it is assumed that there is no change in the channel value for the probing period, i.e., if there is no system performance reduction due to the delayed channel information, the probability density function (PDF) and cumulative density function (CDF) for the estimated SNR can be expressed as Equation (12). In addition, for the subchannel having an SNR lower than a threshold for the 2-step probing ($\gamma_k(m,t)<\alpha$), it is a function for the case where the base station assumes an SNR of the corresponding subchannel as $\gamma_k(m,t)=0$ $$f_\alpha(\gamma_k) = \begin{cases} 0, & 0 \le \gamma_k < \alpha \\ f(\gamma_k), & \gamma_k \ge \alpha \end{cases} \quad (12)$$

$$F_\alpha(\gamma_k) = \begin{cases} F(\alpha), & 0 \le \gamma_k < \alpha \\ F(\gamma_k), & \gamma_k > \alpha \end{cases}$$

Therefore, assuming that the base station allocates the user having the highest SNR for each subchannel to the corresponding subchannel, the system performance of the proposed technique can be expressed as Equation (13).

$$C_{prop} = \int_0^\infty \log_2(1+\gamma_k) K F_\alpha(\gamma_k)^{K-1} f_\alpha(\gamma_k) d\gamma_k \quad (13)$$

$$= \int_\alpha^\infty \log_2(1+\gamma_k) K \left(1-\exp\left(-\frac{\gamma_k}{\gamma_o}\right)\right)^{K-1} \frac{1}{\gamma_o}\exp\left(-\frac{\gamma_k}{\gamma_o}\right) d\gamma_k$$

$$= \int_\alpha^\infty \log_2(1+\gamma_k) K \sum_{i=0}^{K-1} (-1)^i \binom{K-1}{i} \frac{1}{\gamma_o}\exp\left(-\frac{(1+i)\gamma_k}{\gamma_o}\right) d\gamma_k.$$

However, the optimal system performance obtainable under the assumption that the probing signals of all users are transmitted on all subchannels over the full band can be expressed as Equation (14).

$$C_{full} = \int_0^\infty \log_2(1+\gamma_k) K F(\gamma_k)^{K-1} f(\gamma_k) d\gamma_k \quad (14)$$

$$= \int_0^\infty \log_2(1+\gamma_k) K \sum_{i=0}^{K-1} (-1)^i \binom{K-1}{i} \frac{1}{\gamma_o}\exp\left(-\frac{(1+i)\gamma_k}{\gamma_o}\right) d\gamma_k$$

Compared to the optimal system performance, the performance loss in the probing method according to an exemplary embodiment of the present invention is defined as Equation (15).

$$C_{loss} = C_{full} - C_{prop} \quad (15)$$

$$= \int_\alpha^\infty \log_2(1+\gamma_k) K F(\gamma_k)^{K-1} f(\gamma_k) d\gamma_k$$

$$= \int_\alpha^\infty \log_2(1+\gamma_k) K \sum_{i=0}^{K-1} (-1)^i \binom{K-1}{i} \frac{1}{\gamma_o}\exp\left(-\frac{(1+i)\gamma_k}{\gamma_o}\right) d\gamma_k$$

Since an increase in the number k of users causes $F(\gamma_k)<1$ in Equation (15), $F(\gamma_k)^{K-1}$ converges to zero (0) and the system performance loss by the probing method according to an exemplary embodiment of the present invention also converges to '0' ($C_{loss}=0$).

Assuming that the conventional IEEE 802.16e technique transmits the same number of probing signals as an exemplary embodiment of the present invention, the conventional technique cannot select the optimal region according to the channel characteristic. This is because the conventional technique transmits the probing signal for arbitrary consecutive subchannels predetermined in the initialization process without information on the channels.

However, the probing method according to an exemplary embodiment of the present invention, because it finds the optimal subchannel through pre-probing and performs probing thereon, has a higher probability of selecting the optimal region according to the channel characteristic separately for each user.

In analyzing the system performance determined by considering the loss due to the delayed channel information, the delayed channel value $H_k(n,t+\Delta t)$ can be expressed as Equation (16), using $H_k(n,t)$.

$$H_k(n,t+\Delta t) = R_k(\Delta t) H_k(n,t) + \sqrt{1-|R_k(\Delta t)|^2} z_k(n,t) \quad (16)$$

Here, $z_k(n,t)$ denotes a complex Gaussian random variable which is independent of $H_k(n,t)$ and has an average value of 0 and a variance of 1. An SNR of an $m^{th}$ subchannel at time $t+\Delta t$ can be expressed as Equation (17).

$$\gamma_k(m, t+\Delta t) = E\left\{\gamma_0 \frac{1}{N}\sum_{n=0}^{N-1} |H_k(mN+n,t)|^2\right\} \quad (17)$$

$$\approx \gamma_0 |R_k(\Delta t)|^2 E\{|\tilde{H}_k(m,t)|^2\} + \gamma_0(1-|R_k(\Delta t)|^2)$$

An SNR of the user selected through the 'best user selection' scheduling in the subchannel m based on Equation (17) is given as Equation (18).

$$\gamma_o E\{|\tilde{H}_{\pi_m}(m,t)|^2\} \ge \gamma_o \quad (18)$$

This is because each user transmits the probing signal only on the subchannel having the good channel characteristic. If $\Gamma_{\pi_m} \equiv \gamma_o E\{|\tilde{H}_{\pi_m}(m,t)|^2\}$ in Equation (18), the SNR obtainable in the subchannel m at time $t+\Delta t$ is given as Equation (19).

$$\gamma_{\pi_m}(m,t+\Delta t) = |R_k(\Delta t)|^2 \Gamma_{\pi_m} + (1-|R_k(\Delta t)|^2)\gamma_o \quad (19)$$

An increase in the $\Delta t$ reduces $|R_k(\Delta t)|^2$, so an increase in the probing period reduces the total system performance.

Table 1 shows a comparison between the proposed probing method according to an exemplary embodiment of the present invention and the conventional probing method of allocating consecutive probing subchannels in the last region of the uplink and employing them in the TDD system environment.

TABLE 1

| | |
|---|---|
| Number of subcarriers per subchannel (N) | 36 |
| Number of subchannel (M) | 24 |

TABLE 1-continued

| | |
|---|---|
| Average SNR ($\gamma_o$) | 10 dB |
| Doppler spread ($f_D$) | 21.3 Hz |
| rms delay spread ($\tau_{rms}$) | 2300 nsec |
| pre-probing interval ($T_1$) | 25 ms (R($\Delta$t) ≈ 0.1) |
| pre-probing interval ($T_2$) | 5 ms (R($\Delta$t) ≈ 0.85) |
| Channel estimation | Ideal |
| HARQ | Chase combine with maximum retransmission of 3 |

In an exemplary embodiment of the present invention, it is assumed that the users are uniformly distributed in a hexagonal cell. In addition, for the subchannels where no user transmits probing signals, the users are allocated by means of the commercial round-robin scheduler.

Figure 3:
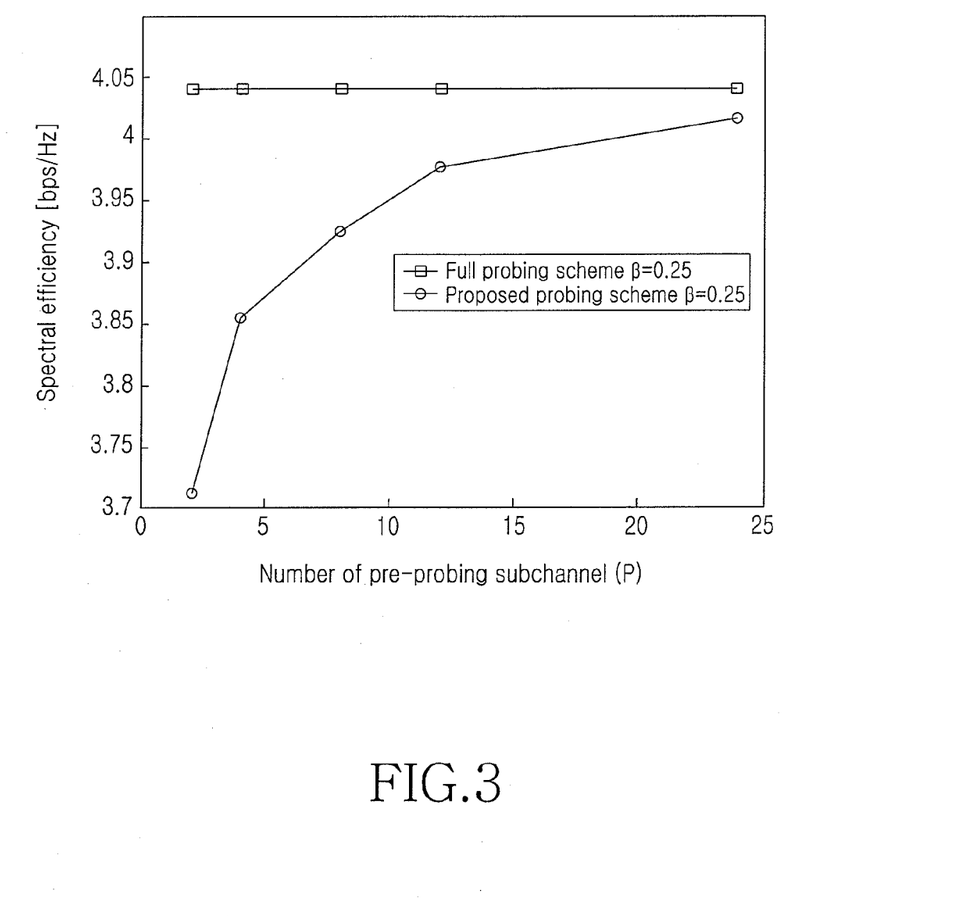
FIG. 3 illustrates performance based on subcarrier allocation for a pre-probing sequence in a probing method of an OFDM packet transmission system according to an exemplary embodiment of the present invention.

FIG. 3 illustrates performance based on subcarrier allocation for a pre-probing sequence in a probing method of an OFDM packet transmission system according to an exemplary embodiment of the present invention.

Referring to FIG. 3, the performance graph includes the simulation result of the pre-probing method of an exemplary embodiment of the present invention for K=12 and β=0.25, where K denotes the number of users and β denotes a threshold control parameter. The performance graph shows the performance obtained by performing pre-probing on a total number P of subchannels on the basis of the same probing burden, setting β=0.25, and performing main-probing only on the selected channel, under the assumption that 36 consecutive subcarriers constitute one subchannel. The number of pre-probing transmission subchannels was adjusted by changing the subcarrier distance d at which the intra-subchannel pre-probing signals are transmitted, under the same probing burden. Because the aim of the pre-probing is to find the region having the best channel characteristic for the 2-step probing transmission, when the same probing resources are used, the method of transmitting the pre-probing signals on more bands by distributing the probing signals (P=24) thereby obtaining a MUD gain is superior in performance to the method of concentratively disposing the probing signals in one subchannel at intervals of a short subcarrier distance (P=2, P=8 and P=12).

Figure 4:
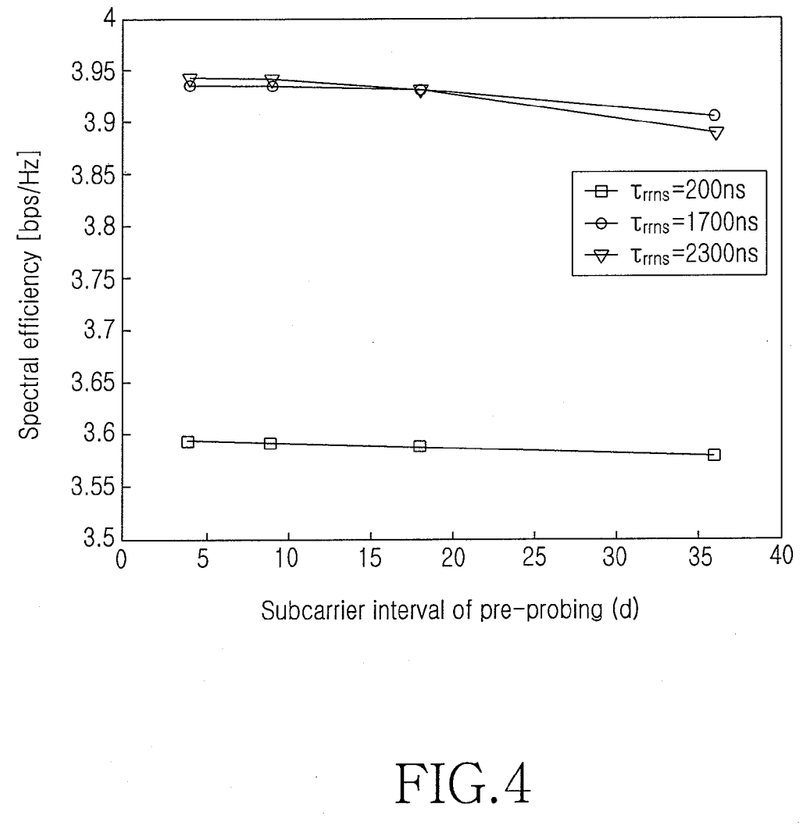
FIG. 4 illustrates performance based on a pre-probing signal distance d in a probing method of an OFDM packet transmission system according to an exemplary embodiment of the present invention.

FIG. 4 illustrates performance based on a pre-probing signal distance d in a probing method of an OFDM packet transmission system according to an exemplary embodiment of the present invention.

Referring to FIG. 4, the performance graph shows the system performance based on a subcarrier distance d of pre-probing for K=4 and β=0.65, where K denotes the number of users and β denotes a threshold control parameter. An increase in the distance d reduces the system performance because the increase reduces the number of pre-probing signals transmitted per subchannel, making it difficult to perform correct channel estimation. It can be appreciated that in the environment where the delay spread of the channel is considerable, an increase in the distance d causes the abrupt reduction in the performance. This is because in the environment having the high channel frequency selectivity, the increase in the subcarrier distance d causes channel variation, making it hard to accurately estimate an SNR of the subchannel.

Figure 5:
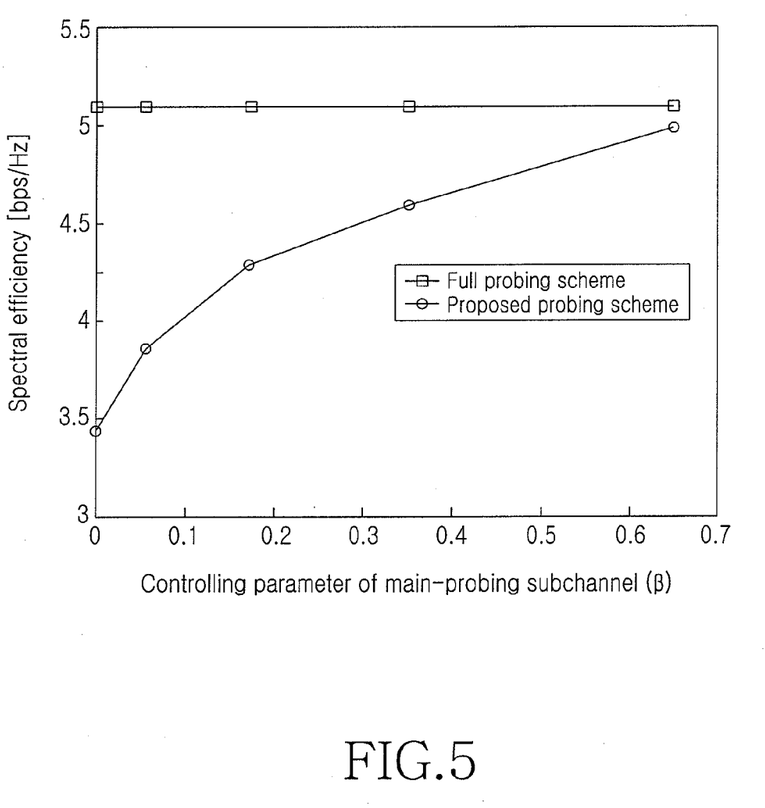
FIG. 5 illustrates performance based on the number of subchannels for main-probing in a probing method of an OFDM packet transmission system according to an exemplary embodiment of the present invention.

FIG. 5 illustrates performance based on the number of subchannels for main-probing in a probing method of an OFDM packet transmission system according to an exemplary embodiment of the present invention.

Referring to FIG. 5, the performance graph shows performance of an exemplary embodiment of the present invention based on the main-probing threshold control parameter β for K=36, where K denotes the number of users. It can be appreciated that an increase in β causes a sharp increase in the performance of the probing method according to an exemplary embodiment of the present invention. This is because an increase in the number of main-probing subchannels reduces the number of subchannels where no user transmits the main-probing signals.

Figure 6:
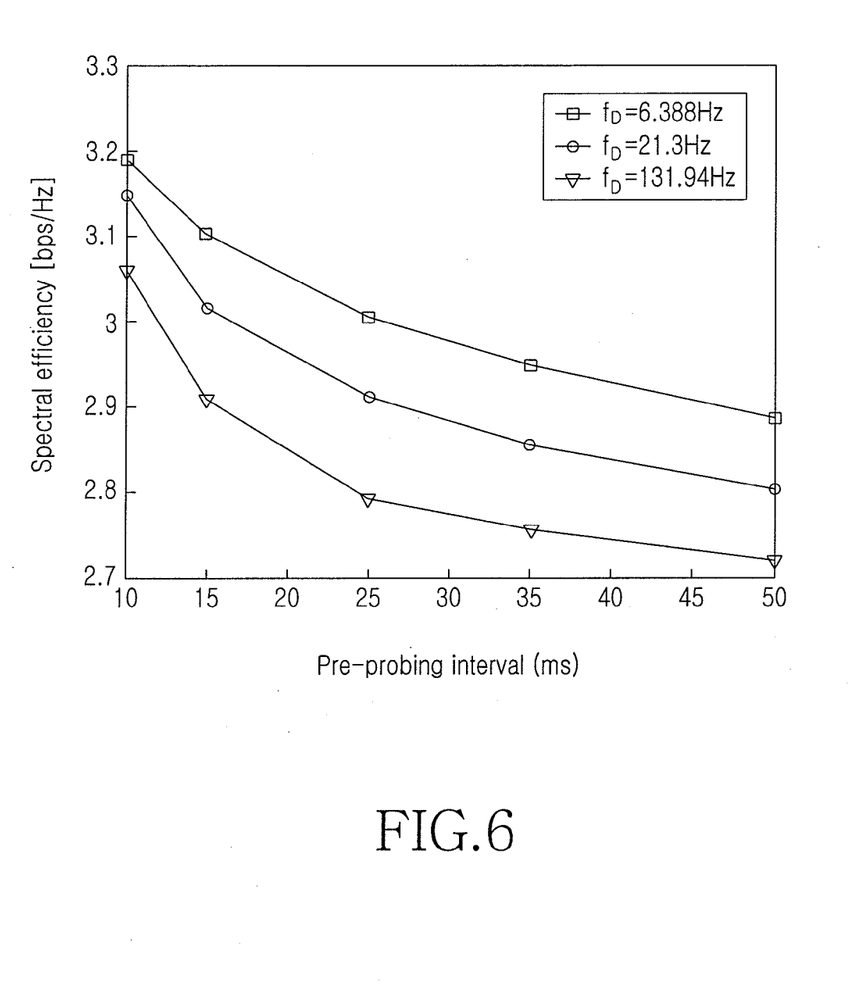
FIG. 6 illustrates performance based on a time interval for pre-probing in a probing method of an OFDM packet transmission system according to an exemplary embodiment of the present invention.

FIG. 6 illustrates performance based on a time interval for pre-probing in a probing method of an OFDM packet transmission system according to an exemplary embodiment of the present invention.

Referring to FIG. 6, the performance graph shows the performance of an exemplary embodiment of the present invention based on the pre-probing distance $T_1$ for K=4, d=36 and β=0, where K denotes the number of users, d denotes a subcarrier distance, and β denotes a threshold control parameter. It can be noted that an increase in the distance $T_1$ reduces the performance. This is because as $T_1$ increases, the selected pre-probing subchannel for each user can no longer obtain the optimal channel characteristic. In addition, an increase in the Doppler value reduces the time correlation between channels, causing the sharp reduction in performance.

Figure 7:
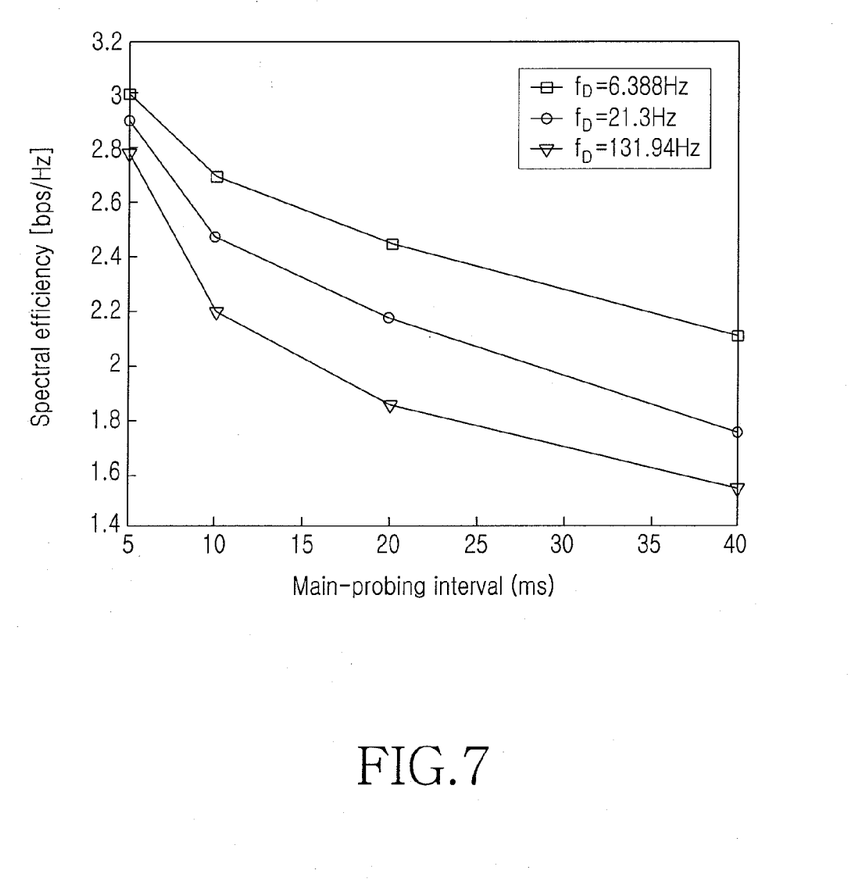
FIG. 7 illustrates performance based on a time interval for main-probing in a probing method of an OFDM packet transmission system according to an exemplary embodiment of the present invention.

FIG. 7 illustrates performance based on a time interval for main-probing in a probing method of an OFDM packet transmission system according to an exemplary embodiment of the present invention.

Referring to FIG. 7, the performance graph shows the performance of an exemplary embodiment of the present invention based on the main-probing distance $T_2$ for K=4, d=36 and β=0, where K denotes the number of users, d denotes a subcarrier distance, and β denotes a threshold control parameter. It can be noted that an increase in the distance $T_2$ reduces the performance. This is because as $T_2$ increases, the MCS selected in the main-probing step is not accurately coincident with the channel value at the time that the data is transmitted, causing an increase in the error rate. Similarly, an increase in the Doppler value reduces the time correlation between channels, causing the sharp reduction in the system performance.

Figure 8:
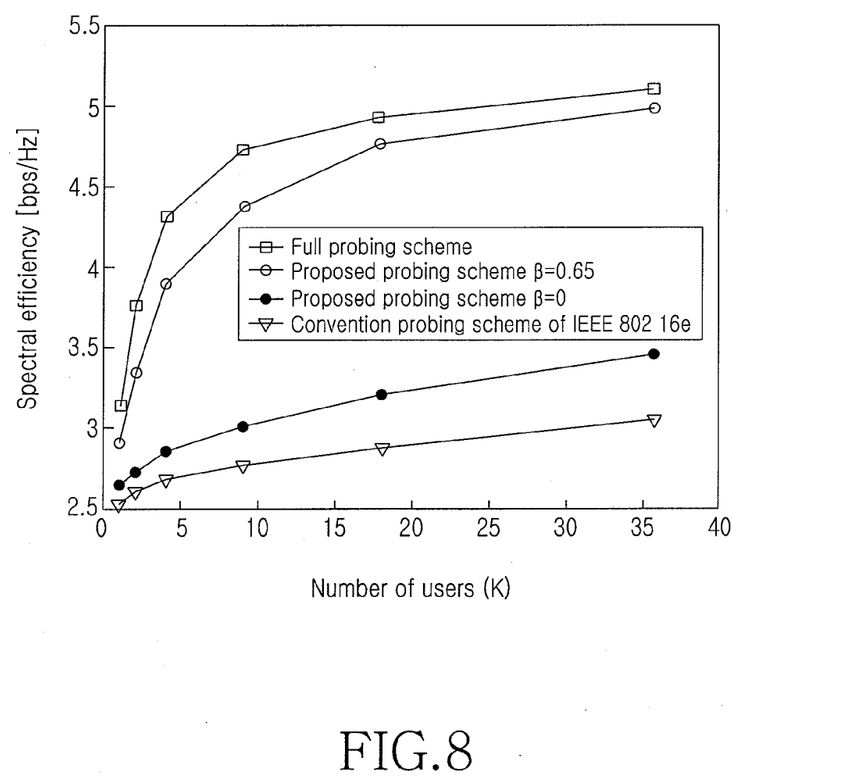
FIG. 8 illustrates performance comparison between a novel probing method of an OFDM packet transmission system according to an exemplary embodiment of the present invention and a conventional probing method.

FIG. 8 illustrates a performance comparison between a novel probing method of an OFDM packet transmission system according to an exemplary embodiment of the present invention and the conventional probing method.

Referring to FIG. 8, it can be noted from the performance graph that the novel probing method proposed by an exemplary embodiment of the present invention shows about 13% improvement in performance as compared to the conventional IEEE 802.16e probing method using the same probing burden, for K=36, d=36 and β=0. This is because the conventional IEEE 802.16e probing method, as it performs probing on a predetermined subchannel, cannot perform probing on the optimal band based on the channel variation. In addition, compared with the optimal performance, the performance loss of the step-by-step probing method proposed by an exemplary embodiment of the present invention decreases with an increase in the number K of users, because the increase in the number K of users reduces the number of subchannels where no user performs probing, thereby obtaining the MUD gain and optimal subchannel selection gain.

As is apparent from the foregoing description, the probing system and method using time channel correlation in the OFDM packet transmission system according to exemplary embodiments of the present invention, designs, as a probing method for increasing the system performance while reducing the probing burden in the OFDM system employing Adaptive Modulation and Coding (AMC), a probing method using the correlation between channels so that it can be used not only for downlink transmission but also for uplink transmission, thereby improving the uplink system performance, and also allocates the optimal frequency band having the best channel condition separately for each user through the step-by-step probing approach, thereby maximizing the system performance.

Further, exemplary embodiments of the present invention obtain frequency diversity and MUD gain by optimal band selection while minimizing the probing burden with use of the time correlation between channels, thereby ensuring the improved performance.

As a result, exemplary embodiments of the present invention facilitate efficient packet services of wideband wireless mobile communication networks, and enable various multimedia content services. Exemplary embodiments of the preset invention, ultimately, provide the fundamental technology capable of bringing an increase in the quality and quantity of the conventional mobile communication market, thereby enabling prior occupation of the technology capable of allowing the users to easily enjoy various desired multimedia services with anyone anyplace anytime in the future communication environment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for probing a channel by a base station in a communication system, the method comprising:
   performing pre-probing for adjusting a subcarrier distance of a probing signal and selecting a subchannel for the probing signal according to a channel status of frequency domain; and
   performing main-probing for transmitting the probing signal on the selected subchannel,
   wherein the subcarrier distance is a distance in frequency between adjacent subcarriers on which probing signals are transmitted.

2. The method of claim 1, further comprising determining, by each of a plurality of users, a time channel correlation by estimating a channel correlation in a time domain using a downlink common pilot signal and reporting the estimated channel correlation to the base station.

3. The method of claim 1, further comprising determining, by each of a plurality of users, a frequency selectivity of each user by estimating a frequency selectivity in a frequency domain using a downlink common pilot signal and reporting the estimated frequency selectivity to the base station.

4. The method of claim 1, wherein the performing of the pre-probing comprises:
   transmitting, by each of a plurality of users, a pre-probing signal satisfying $$P_k^p(dl+k, t) = c^p(l, t)$$

at intervals of a predetermined distance d ($\geq K$) on a subcarrier over a full band;
   estimating, by the base station, the pre-probing signal; and
   finding a subchannel set $S_k$ satisfying $S_k = \{\hat{m}_k | \gamma_k(\hat{m}_k, t) \geq \alpha_k\}$ having a Signal-to-Noise Ratio (SNR) higher than a particular threshold $\alpha_k$,
   wherein $c^p(l,t)$ denotes an $l^{th}$ signal of a pilot sequence at a time t, a superscript p denotes a pre-probing step, $\hat{m}_k$ denotes a subchannel which is an element of the subchannel set $S_k$, $\gamma_k(\hat{m}_k, t)$ denotes an instantaneous SNR of an arbitrary user k at time t, estimated in an $m_k^{th}$ subchannel, K denotes a total number of users, k denotes an index allocated to a user, the distance d is measured in frequency, and t denotes time.

5. The method of claim 4, wherein the particular threshold $\alpha_k$ is determined by adjusting a threshold control parameter $\beta$ satisfying $\alpha_k = (1-\beta)(\max\{\gamma_k(m,t)\}) + \beta(\min\{\gamma_k(m,t)\})$, $0 \leq \beta \leq 1$, where $\gamma_k(m,t)$ denotes an instantaneous SNR of an arbitrary user k at time t, estimated in an $m^{th}$ subchannel.

6. The method of claim 5, wherein the estimated instantaneous SNR $\gamma_k(m,t)$ satisfies $\gamma_k(m,t) = |\tilde{H}_k(m,t)|^2 \gamma_o$ and wherein when a channel gain of an $n^{th}$ subcarrier of a user k at time t is denoted by $H_k(n,t)$, $\tilde{H}_k(m,t)$ denotes a channel gain in an $m^{th}$ subchannel, obtained by averaging channel gains of all subcarriers, and $\gamma_o$ denotes an average SNR.

7. The method of claim 1, wherein the performing of the main-probing comprises:
   transmitting a main-probing signal satisfying $$P_k^m(\hat{m}_k N + l, t) = c^p(l, t)\exp\left(\frac{-j2\pi n(k-1)}{\mu}\right), \hat{m}_k \in S_k$$

on a subchannel $\hat{m}_k$ in a subchannel set $S_k$, selected in the pre-probing,
   wherein $c^p(l,t)$ denotes an $l^{th}$ signal of a pilot sequence at a time t, superscript m denotes a main-probing step, $\mu$ denotes a pilot phase-shift value of an uplink, k ($1 \leq k \leq \mu$) denotes an index allocated to a user that simultaneously transmits a probing sequence in the same subcarrier, N denotes a number of subcarriers per subchannel, and n is a subcarrier.

8. The method of claim 1, wherein a period $T_1$ of the pre-probing is determined as a value satisfying $$\hat{T}_1 = \underset{T_1}{\operatorname{argmax}}\{R_k(T_1) \leq \delta_1\},$$

wherein $\delta_1$ denotes a correlation threshold, and is determined based on a time channel correlation of each of a plurality of users, reported to the base station, and $R_k(T_1)$ is a correlation of the period $T_1$.

9. The method of claim 1, wherein a period $T_2$ of the main-probing is determined as a value satisfying $$\hat{T}_2 = \underset{T_2}{\operatorname{argmax}}\{R_k(T_2) \leq \delta_2\},$$

wherein $\delta_2$ denotes a correlation threshold, and is determined based on a time channel correlation of each user, reported to the base station, and $R_k(T_2)$ is a correlation of the period $T_2$.

10. A system for probing a channel in a communication system, the system comprising:
   a base station for performing pre-probing for adjusting a subcarrier distance of a probing signal and selecting a subchannel for the probing signal according to a channel status of frequency domain, and for performing main-probing for transmitting the probing signal on the selected subchannel,
   wherein the subcarrier distance is a distance in frequency between adjacent subcarriers on which probing signals are transmitted.

11. The system of claim 10, wherein each of a plurality of users estimates a channel correlation in a time domain using a downlink common pilot signal and reports the estimated channel correlation to the base station.

12. The system of claim 10, wherein each of a plurality of users estimates a frequency selectivity in a frequency domain using a downlink common pilot signal, and reports the estimated frequency selectivity to the base station.

13. The system of claim 10, wherein each of multiple users transmits a pre-probing signal satisfying $$P_k^p(dl+k, t) = c^p(l, t)$$

at intervals of a predetermined distance d ($\geq$K) on a subcarrier over a full band, and the base station estimates the pre-probing signal and finds a subchannel set $S_k$ satisfying $S_k = \{\hat{m}_k | \gamma_k(\hat{m}_k, t) \geq \alpha_k\}$ having a Signal-to-Noise Ratio (SNR) higher than a particular threshold $\alpha_k$, wherein $c^p(l,t)$ denotes an $l^{th}$ signal of a pilot sequence at time t, a superscript p denotes a pre-probing step, $\hat{m}_k$ denotes a subchannel which is an element of the subchannel set $S_k$, $\gamma_k(\hat{m}_k, t)$ denotes an instantaneous SNR of an arbitrary user k at time t, estimated in an $m_k^{th}$ subchannel, K denotes a total number of users, k denotes an index allocated to a user, the distance d is measured in frequency, and t denotes time.

14. The system of claim 13, wherein the particular threshold $\alpha_k$ is determined by adjusting a threshold control parameter $\beta$ satisfying $\alpha_k = (1-\beta)(\max\{\gamma_k(m,t)\}) + \beta(\min\{\gamma_k(m,t)\})$, $0 \leq \beta \leq 1$, where $\gamma_k(m,t)$ denotes an instantaneous SNR of an arbitrary user k at time t, estimated in an $m^{th}$ subchannel.

15. The system of claim 14, wherein the estimated instantaneous SNR $\gamma_k(m,t)$ satisfies $\gamma_k(m,t) = |\tilde{H}_k(m,t)|^2 \gamma_o$, wherein when a channel gain of an $n^{th}$ subcarrier of a user k at time t is denoted by $H_k(n,t)$, $\tilde{H}_k(m,t)$ denotes a channel gain in an $m^{th}$ subchannel, obtained by averaging channel gains of all subcarriers, and $\gamma_o$ denotes an average SNR.

16. The system of claim 10, wherein the base station transmits a main-probing signal satisfying $$P_k^m(\hat{m}_k N + l, t) = c^p(l, t) \exp\left(\frac{-j2\pi n(k-1)}{\mu}\right), \hat{m}_k \in S_k$$

on a subchannel $\hat{m}_k$ in a subchannel set $S_k$, selected in the pre-probing, wherein $c^p(l,t)$ denotes an $l^{th}$ signal of a pilot sequence at a time t, a superscript m denotes a main-probing step, $\mu$ denotes a pilot phase-shift value of an uplink, k ($1 \leq k \leq \mu$) denotes an index allocated to a user that simultaneously transmits a probing sequence in the same subcarrier, N denotes a number of subcarriers per subchannel, and n is a subcarrier.

17. The system of claim 10, wherein a period $T_1$ of the pre-probing is determined as a value satisfying $$\hat{T}_1 = \underset{T_1}{\arg\max}\{R_k(T_1) \leq \delta_1\},$$

wherein $\delta_1$ denotes a correlation threshold and is determined based on a time channel correlation of each of a plurality of users, reported to the base station, and $R_k(T_1)$ is a correlation of the period $T_1$.

18. The system of claim 10, wherein a period $T_2$ of the main-probing is determined as a value satisfying $$\hat{T}_2 = \underset{T_2}{\arg\max}\{R_k(T_2) \leq \delta_2\},$$

wherein $\delta_2$ denotes a correlation threshold and is determined based on a time channel correlation of each user, reported to the base station, and $R_k(T_2)$ is a correlation of the period $T_2$.

* * * * *